United States Patent
Suganami

(10) Patent No.: US 8,799,633 B2
(45) Date of Patent: Aug. 5, 2014

(54) MAC FILTERING ON ETHERNET PHY FOR WAKE-ON-LAN

(75) Inventor: Kenichi Suganami, Tokyo (JP)

(73) Assignee: Standard Microsystems Corporation, Happauge, NY (US)

( * ) Notice: Subject to any disclaimer, the term of this patent is extended or adjusted under 35 U.S.C. 154(b) by 342 days.

(21) Appl. No.: 13/025,818

(22) Filed: Feb. 11, 2011

(65) Prior Publication Data

US 2012/0210112 A1      Aug. 16, 2012

(51) Int. Cl.
  *G06F 9/00*    (2006.01)
  *G06F 1/00*    (2006.01)

(52) U.S. Cl.
  USPC ................ 713/2; 713/323; 713/324

(58) Field of Classification Search
  None
  See application file for complete search history.

(56) References Cited

U.S. PATENT DOCUMENTS

| | | | |
|---|---|---|---|
| 5,598,581 A | 1/1997 | Daines et al. | |
| 6,385,647 B1 | 5/2002 | Willis et al. | |
| 6,473,441 B1 | 10/2002 | Dygert | |
| 6,611,531 B1 | 8/2003 | Chen et al. | |
| 6,678,740 B1 | 1/2004 | Rakib et al. | |
| 7,050,440 B2 | 5/2006 | Colmant et al. | |
| 7,680,943 B2 | 3/2010 | Conta et al. | |
| 7,840,706 B1 | 11/2010 | Abdulla et al. | |
| 8,345,673 B1 * | 1/2013 | Lo et al. | 370/366 |
| 2001/0004768 A1 | 6/2001 | Hodge et al. | |
| 2001/0005908 A1 | 6/2001 | Hodge et al. | |
| 2002/0007494 A1 | 1/2002 | Hodge | |
| 2002/0015409 A1 | 2/2002 | Gao et al. | |
| 2002/0019984 A1 | 2/2002 | Rakib | |
| 2002/0048258 A1 | 4/2002 | Oyama | |
| 2002/0059637 A1 | 5/2002 | Rakib | |
| 2002/0087976 A1 | 7/2002 | Kaplan et al. | |
| 2002/0091003 A1 | 7/2002 | Beken | |
| 2002/0095681 A1 | 7/2002 | Lin et al. | |

(Continued)

FOREIGN PATENT DOCUMENTS

| | | |
|---|---|---|
| JP | 2004-336437 | 11/2004 |
| JP | 2005-341107 | 12/2005 |
| WO | 99-65196 | 12/1999 |
| WO | 03/063425 | 7/2003 |

OTHER PUBLICATIONS

"Product Brief: TF-530 Digital TV Streaming Controller," taifatech: Optimizing Design Through ASIC, Taifatech, Inc., 2 pages. (Retrieved Oct. 24, 2004).

(Continued)

*Primary Examiner* — Kim Huynh
*Assistant Examiner* — Vincent Chang
(74) *Attorney, Agent, or Firm* — King & Spalding L.L.P.

(57) ABSTRACT

To improve Wake-on-LAN (WOL) functionality of a device, a Media Access Control (MAC) address filtering function may be implemented in the device's Ethernet physical layer (ePHY) block. When the ePHY detects a WOL frame, the MAC filtering function in the ePHY may perform address comparison between the MAC address associated with the device, and the MAC address contained in the WOL frame. Performing the MAC address comparison within the ePHY allows the main system components, such as the main SOC and other components to remain in standby mode (or sleep mode) until a MAC address match has been determined. Therefore, the main system components do not need to be rebooted every time the device receives a WOL frame, only when there is a match between the MAC address of the system and the MAC address contained in the detected WOL packet.

19 Claims, 5 Drawing Sheets

(56) References Cited

U.S. PATENT DOCUMENTS

| | | |
|---|---|---|
| 2002/0143996 A1 | 10/2002 | Odryna et al. |
| 2002/0147982 A1 | 10/2002 | Naidoo et al. |
| 2002/0161918 A1 | 10/2002 | Asano et al. |
| 2002/0178274 A1 | 11/2002 | Kovacevic |
| 2003/0050989 A1 | 3/2003 | Marinescu et al. |
| 2003/0058885 A1 | 3/2003 | Sorenson et al. |
| 2003/0061621 A1 | 3/2003 | Petty et al. |
| 2003/0081131 A1 | 5/2003 | Farnan et al. |
| 2003/0093563 A1 | 5/2003 | Young et al. |
| 2003/0126294 A1 | 7/2003 | Thorsteinson et al. |
| 2003/0133456 A1 | 7/2003 | Beck |
| 2003/0163826 A1 | 8/2003 | Weinstein |
| 2003/0169314 A1 | 9/2003 | McAlonis |
| 2004/0141461 A1* | 7/2004 | Zimmer et al. ............... 370/216 |
| 2004/0172658 A1 | 9/2004 | Rakib et al. |
| 2008/0219196 A1 | 9/2008 | Ptasinski |
| 2008/0270599 A1 | 10/2008 | Tamir et al. |
| 2009/0241113 A1 | 9/2009 | Seguin et al. |
| 2010/0218011 A1 | 8/2010 | Diab et al. |
| 2011/0078299 A1 | 3/2011 | Nagapudi et al. |

OTHER PUBLICATIONS

Official Action in Japanese Application No. 2006-018622 filed Jul. 1, 2008, 3 pages.
Taiwanese Patent Office Search Report for Application No. 095102844, search completed May 26, 2008, 6 pages.
Taiwanese Patent Application TW 513635, published Dec. 11, 2002, 1 page, (abstract only).
International Search Report and Written Opinion for Application No. PCT/US2006/000126 mailed Sep. 19, 2006, 7 pages.
International Search Report in Application No. PCT/US2012/021992 dated Mar. 14, 2012, 6 pages.
Taiwan Office Action, Application No. 101104227, 14 pages.

\* cited by examiner

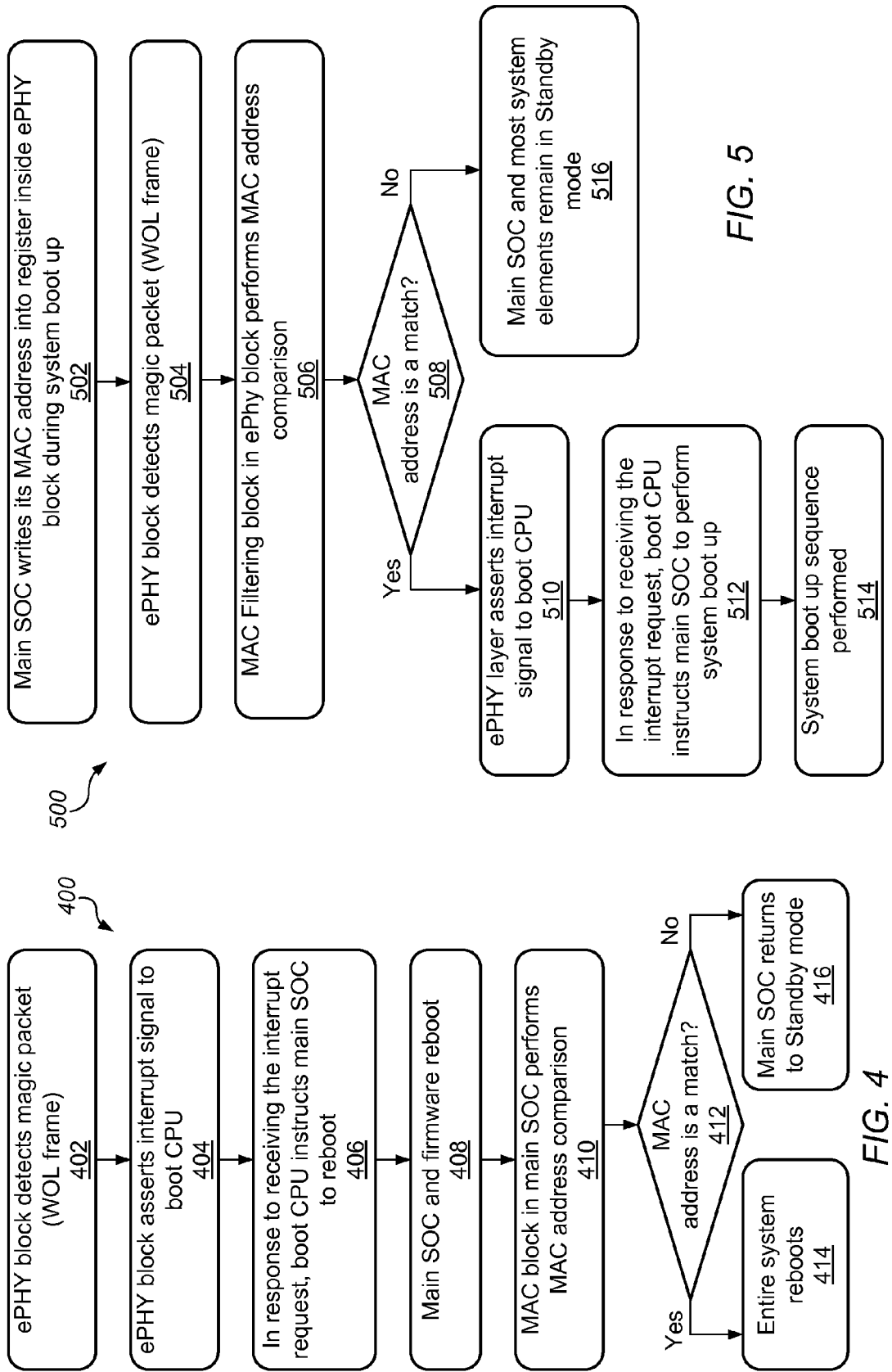

| WOL sequence | Operation illustrated in Fig. 4 | Operation illustrated in Fig. 5 |
|---|---|---|
| 1. | ePHY detects WOL packet frame | ePHY detects WOL packet frame |
| 2. | ePHY generates interrupt to boot CPU | ePHY compares MAC addresses |
| 3. | Boot CPU reboots SOC and firmware | ePHY generates interrupt to boot CPU if MAC addresses match |
| 4. | SOC boots up, and compares MAC addresses | SOC and system boot up or remain in standby mode according to WOL |
| 5. | If MAC address does not match, SOC returns to standby mode. | |
| 6. | If MAC address is a match, system starts reboot. | |

FIG. 6

MAC FILTERING ON ETHERNET PHY FOR WAKE-ON-LAN

BACKGROUND OF THE INVENTION

1. Field of the Invention

This invention relates generally to computer networking and, more particularly, to the design of media access control (MAC) filtering on Ethernet physical layer (PHY).

2. Description of the Related Art

Various interface standards for connecting computers and external peripherals are in wide use today, each aiming to provide simple connectivity at high speeds. Examples of such standards include the IEEE (Institute of Electrical and Electronics Engineers) 1394 standard also referred to as FireWire, and the Universal Serial Bus (USB), both high-speed serial bus protocols. The most widely used networking standard for connecting computers in both Local Area Networks (LANs) and Wide Area Networks (WANs) has been the Ethernet protocol. More specifically, Ethernet is the IEEE 802.3 series standard, originally based on the Carrier Sense Multiple Access with Collision Detection (CSMA/CD) method that provided a means for two or more computer stations to share a common cabling system. CSMA/CD has formed the basis for Ethernet systems that reached transfer speeds in the megabit range, that is the Mbit/sec range. Recent switched based and/or router based Ethernet systems are capable of supporting transfer rates in the Gbit/sec range. Ethernet generally makes efficient use of shared resources, is typically easy to reconfigure and maintain, and provides compatibility across many manufacturers and systems, while keeping the cost low.

The Ethernet defines a number of wiring and signaling standards for the physical layer (PHY), through means of network access at the Media Access Control (MAC)/Data Link Layer, and through a common addressing format. Above the PHY, Ethernet enabled devices typically communicate by transmitting data packets, which comprise blocks of data that are individually sent and delivered. As with other IEEE 802 LANs, each Ethernet station is given a single 48-bit MAC address, which is used both to specify the destination and the source of each data packet. The MAC data communication protocol sub-layer is a sub-layer of the data link layer specified in the seven-layer OSI (Open System Interconnect) model (layer 2), and acts as an interface between the Logical Link Control (LLC) sub-layer and the network's physical layer. It emulates a full-duplex logical communication channel in a multipoint network to provide addressing and channel access control mechanisms that make it possible for several terminals or network nodes to communicate within a multipoint network, typically a LAN or a WAN.

Wake-on-LAN (WOL) is an Ethernet-based computer networking standard developed to turn on or wake up computers through a network packet. The wake up packet is typically transmitted by a program that is executed on another computer on the same LAN. In case the awakened computer is communicating via Wi-Fi, a supplementary standard called Wake on Wireless LAN (WoWLAN) is employed to remotely wake up the computer. The WOL and WoWLAN standards are often supplemented by vendors to provide protocol-transparent on-demand services. WOL support is typically implemented on the motherboard (e.g. in the BIOS) of a computer and the network interface (firmware), and is therefore operating system independent. Some operating systems, however, can control WOL behaviour via hardware drivers. Motherboards with an embedded Ethernet controller that supports WOL do not require cable connections, but if the network interface is a plug-in card rather than an integrated feature on the motherboard, the plug-in card may need to be connected to the motherboard by a cable.

WOL is implemented by transmitting a special packet referred to as "a magic packet" uniquely defined for the purpose of waking up the computer. The magic packet contains the MAC address of the destination computer, which the listening computer can identify to recognize that a magic packet is addressed to it. Upon receipt of the magic packet and having recognized the MAC address, the destination computer initiates system wake-up. The magic packet is sent on the data link layer and broadcast to all network interface controllers (NICs), which may be separate interface cards or may be built in on the motherboard, using the network broadcast address. Hence, the WOL feature is platform-independent. In order for WOL to work properly, at least certain portions of the network interface circuitry are required to remain turned on in order to detect a magic packet, thereby consuming standby power. If WOL is not required, disabling it may reduce power consumption slightly while the computer is switched off but remains plugged into power.

The magic packet is typically a broadcast frame containing six bytes all having a value of 255 (FFFFFFFFFFFF in hexadecimal) anywhere within its payload, followed by sixteen repetitions of the target computer's 48-bit MAC address. Since the magic packet is only scanned for the above string, and not parsed by a full protocol stack, it may be sent as any network-layer and transport-layer protocol. Magic packets are typically sent as UDP datagrams to port 7 or port 9, but they may be targeting any of the available ports. Standard magic packets require a destination computer MAC address, they do not provide a delivery confirmation, they may not work outside the LAN, and they may require hardware support of WOL on the destination computer, as the WOL implementation is designed to be simple and is intended for quick processing by the NIC circuitry, with minimal power requirement. Since WOL operates below the protocol layer, the MAC address is required, and WOL may not be performed using IP addresses and/or DNS names.

Other corresponding issues related to the prior art will become apparent to one skilled in the art after comparing such prior art with the present invention as described herein.

SUMMARY OF THE INVENTION

In one set of embodiments, in order to improve Wake-on-LAN (WOL) functionality, a Media Access Control (MAC) address filtering function may be implemented on an Ethernet physical layer (ePHY), for example on a 10/100 ePHY. The filtering function on the ePHY performs the MAC address comparison between the MAC address identifying the given computer and the incoming MAC address contained in the magic packet transmitted onto the LAN connection infrastructure, e.g. an Ethernet network connection. For example, a MAC address on a system-on-chip (SoC) within the computer may be matched with the MAC address contained in the incoming WOL packet frame. Performing the MAC address comparison within the ePHY allows the main system components, such as the main SoC and other components to remain in standby mode (or sleep mode) until a MAC address match has been determined. Therefore, the main system components do not need to be rebooted every time the device receives a WOL frame, only when there is a match between the MAC address of the system and the MAC address contained in the detected WOL packet.

In one set of embodiments, an internal register within the ePHY on a network interface controller (NIC) may store the MAC address identifying the SoC (or computer). During a system boot, the SOC may write its MAC address into the internal register on the ePHY of the NIC. The main SOC and all peripheral large-scale integrated (LSI) circuitry may enter a standby mode, except for the ePHY of the NIC, which may remain turned on to wait for WOL packet frames received by the ePHY. The ePHY may detect the package frame, and perform the MAC address comparison to determine if there is a match. When the MAC address is matched to the MAC address stored in the ePHY's internal register, the ePHY may generate an interrupt (INT) signal to an external boot processing unit (e.g. an external boot CPU) to start boot the system. Because in case of a MAC address match the ePHY has already confirmed that the WOL is for the given SOC (or computer), the SOC (computer) may proceed and reboot without having to identify and match the received MAC address, and may remain in standby mode if the ePHY has determined that the MAC address in the magic packet does not match the MAC address associated with the SOC.

In some embodiments, a device having a device address may include one or more primary device components configured to enter a low power mode when so instructed, and may also include a network connectivity physical layer (PHY) block to couple the device to a network. The PHY may also detect over the network a first packet comprising a target address, even when the one or more primary components of the device are in the low-power mode, with the first packet intended to wake up a target device associated with the target address. The one or more primary components of the device may include an SOC that includes a MAC block, with the device address being a MAC address. The PHY block may be an Ethernet PHY block that includes a MAC filter module to compare the target address with the device address. The PHY may compare the target address with the device address, and initiate a process instructing the one or more primary device components to exit the low power mode if the one or more primary device components are in the low power mode and the comparison indicates that the target address matches the device address.

BRIEF DESCRIPTION OF THE DRAWINGS

The foregoing, as well as other objects, features, and advantages of this invention may be more completely understood by reference to the following detailed description when read together with the accompanying drawings in which:

FIG. 4 shows a flow chart illustrating operation of a device exemplified in FIG. 2, upon receiving a WOL packet frame;

FIG. 5 shows a flow chart illustrating operation of a device exemplified in FIG. 3, upon receiving a WOL packet frame; and FIG. 6 shows a table highlighting the benefits of performing media access control (MAC) address filtering in an Ethernet physical layer (ePHY).

Figure 1:
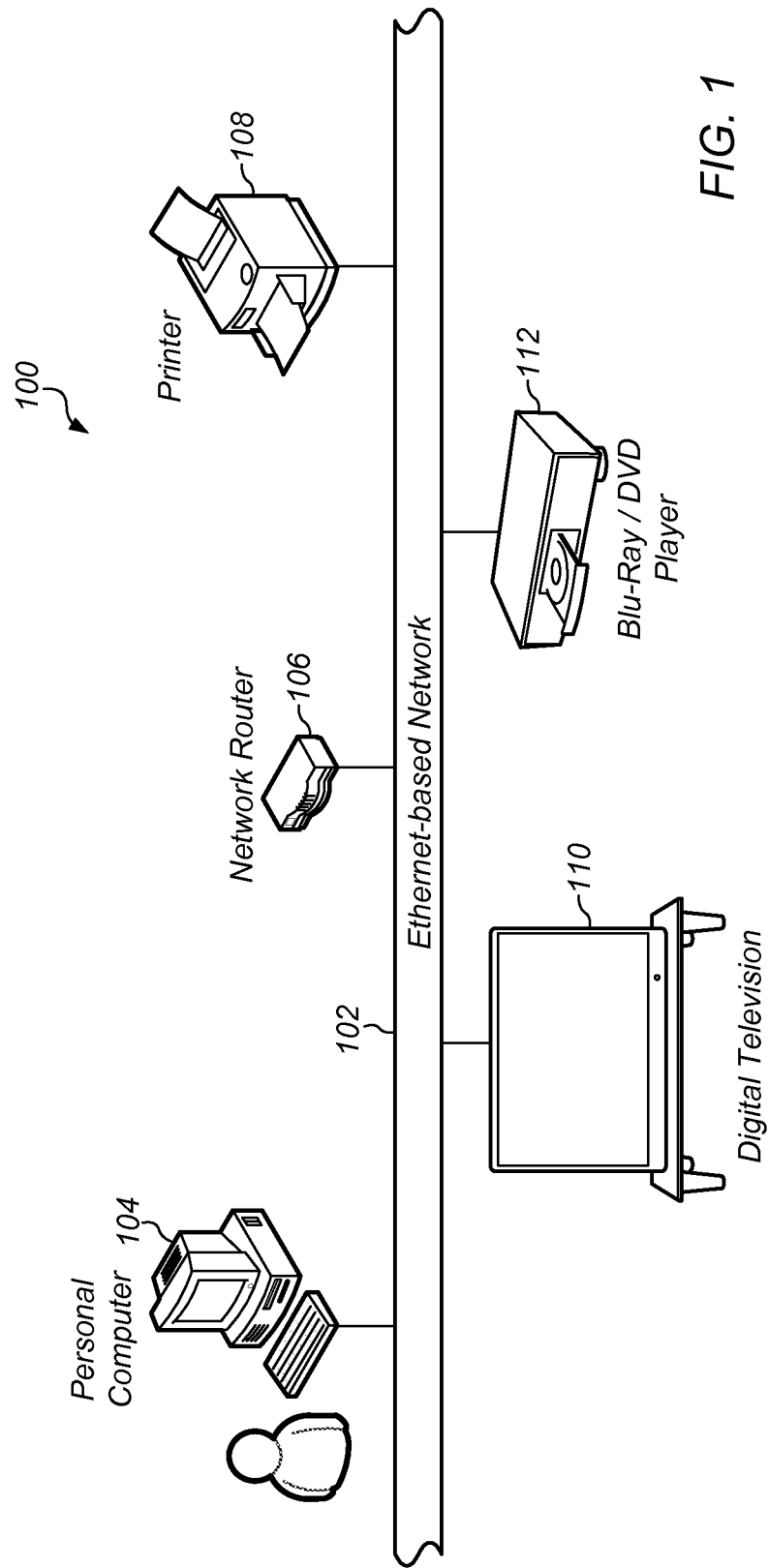
FIG. 1 shows a high-level system diagram of one embodiment of a local area network (LAN) coupling multiple devices having Wake-on-LAN (WOL) capabilities.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

Wake-On-LAN (WOL) is mandatory function in Digital Television (DTV), Digital Video Recorder (DVR), Printer and other Consumer Electronic (CE) products for power saving during system standby. As used herein, system standby mode or sleep mode refers to any low-power mode, which the device might enter upon being so instructed, to conserve energy and power. Furthermore, a system standby or device standby refers to a main system block and/or associated components of the system/device residing in the low-power mode, while select, but few, components within the system/device may remain operational. For example, a printer may be considered in full sleep mode, when with the exception of an Ethernet physical layer (ePHY) block and/or a secondary (boot) processing unit, all components within the printer reside in low-power mode.

In general, WOL enables main system-on-chip (SOC) and other peripheral large-scale integrated (LSI) circuits and other components in a computer or other LAN-connected device to power off in standby mode, requiring only that a network interface controller (NIC), e.g. an Ethernet controller be powered up and monitor the Ethernet connection for WOL packets, which can initiate a reboot of the portions of the system that are in standby mode. FIG. 1 shows one embodiment of a LAN 100 built around an Ethernet-based network connection 102, and devices connected to network connection 102. Connected devices may include a personal computer 104, network router 106, printer 108, digital television (DTV) 110, and Blu-Ray/DVD player 112. LAN 100 is shown for illustration purposes, and in alternate embodiments, fewer or additional devices may be connected to network connection 102. In addition, network connection 102 may also be a wireless connection or a WiFi connection, or any connection suitable for connecting devices together into a network, or LAN.

In order to enable WOL functionality in the devices in LAN 100, each device that supports WOL functionality may include a media access control (MAC) address block and a physical (PHY) block for detecting the magic packets transmitted over network connection 102 as part of a WOL transmission, recognizing the magic packets, and determining which device the WOL instruction is intended for. For example, personal computer 104 may generate and transmit a magic packet intended to wake up printer 108 onto network connection 102. A PHY block within printer 108 may perform detection of the WOL packet frame, and a MAC block within printer 108 may perform an address comparison to determine if its MAC address and the MAC address in the incoming WOL packet is the same. Once the MAC addresses have been matched, printer 108 may proceed to wake up from sleep mode.

The MAC block may be typically integrated into the main SOC or processing block of the connected device/computer. Consequently, the main SOC in that device may need to wake up, or reboot from standby mode in order to detect the WOL upon receipt of a magic packet, and compare its MAC address with the MAC address contained in the WOL packet to determine which device the magic packet was intended for. While the WOL feature is meant to allow a main SOC to enter sleep mode in order to save power, the SOC cannot remain in sleep mode at all times if it supports WOL. More specifically, every time a magic packet is transmitted to the LAN network connection 102, the main SOC in each device needs to exit sleep mode to acknowledge the packet, and make the MAC address comparison. It should be noted that while embodiments explicitly discussed herein mention an SOC within the device, the SOC in general is meant to refer to the main circuitry and/or system circuitry within a given device. In other words, it may refer to an SOC, or an SOC in combination with other circuitry on a motherboard, or any other primary system circuitry that is to reside in a reduced power mode (e.g. sleep mode) when not in use, i.e. when not waken up.

Figure 2:
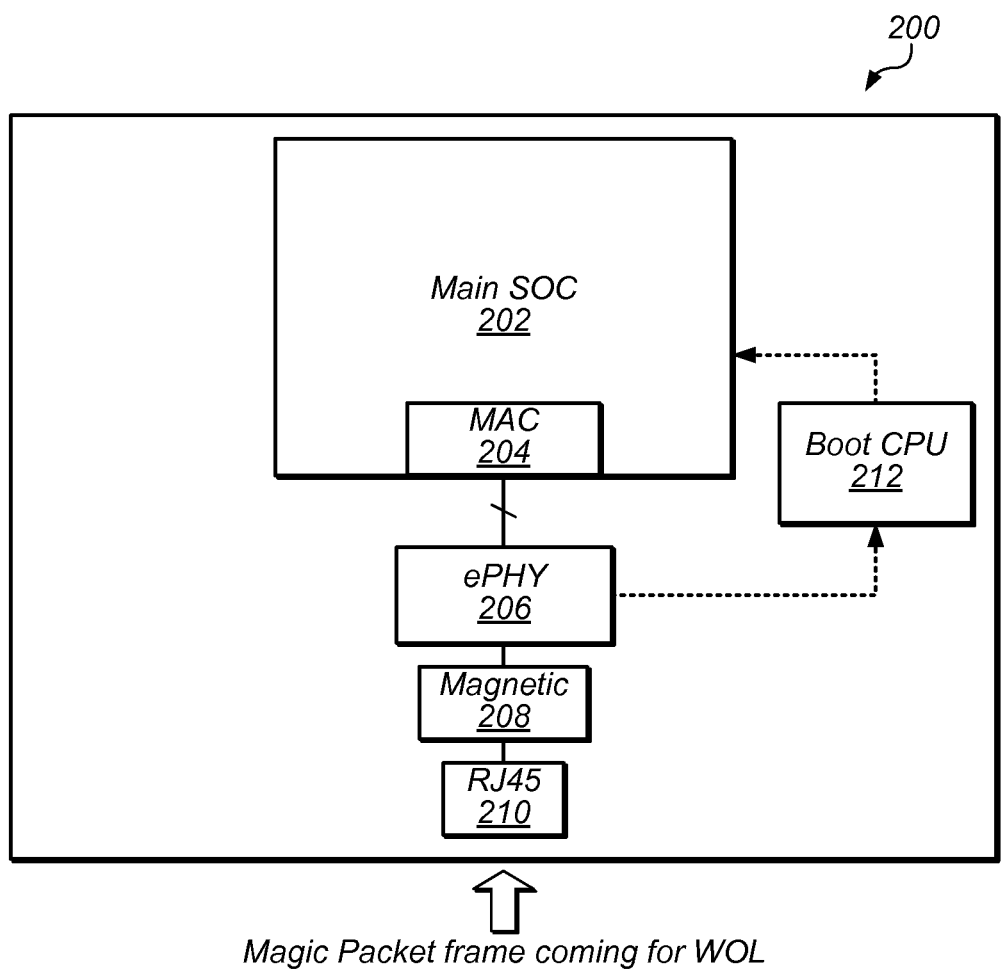
FIG. 2 shows a functional block diagram of one embodiment of a computer that can perform a WOL function.

As mentioned above, each of the devices connecting to network connection 102 and supporting WOL needs to recognize and process a magic packet, when the Ethernet physical layer (ePHY) within the device receives a magic packet. In other words, upon receipt of the magic packet by the ePHY within the device, the respective SOC within each device needs to wake up, regardless of which of the attached devices the magic packet is targeting. One possible way of solving this issue, is by incorporating a boot CPU separate from the main SOC (i.e. separate from the main CPU of the system), having an interrupt (INT) pin, and signaling the boot CPU via this interrupt pin to instruct the boot CPU that the ePHY has received a WOL packet frame. A partial block diagram of one embodiment of such a device is shown in FIG. 2.

Device 200 shown in 2 may represent any of the devices coupling to network connection 102, as shown in FIG. 1. Device 200 may couple to network connection 102 via an RJ45 connector 210, interfacing with the ePHY layer 206 via magnetic coupling 208. The ePHY layer interfaces with the MAC layer 204 within main SOC 202. Upon detecting a magic packet, received from network connection 102 for example, ePHY layer may transmit an interrupt to boot CPU 212 via the INT pin of boot CPU 212. Upon detecting the interrupt, boot CPU 212 may instruct main SOC 202 to perform a MAC address comparison to determine whether the incoming magic packet contains the MAC address in MAC layer 204 identifying device 200, which would indicate that the WOL was intended for device 200. If the MAC address in the incoming packet frame is a match for the MAC address in MAC layer 204, SOC 202 may remain in operational mode. If the MAC address in the incoming packet frame is not a match with the MAC address in MAC layer 204, SOC 202 may enter standby mode, and may eventually return to sleep mode, while ePHY 206 remains in a wake up state, i.e. in operational mode.

The solution described above not only requires a boot sequence for main SOC 202, but also for the entire device to power on for the sole purpose of matching the MAC address in MAC 204 of main SOC 202 with the MAC address contained in the received magic packet. For example, if device 200 represents DTV 102 from FIG. 1, the whole DTV 102 may need to power on just to perform the MAC address comparison. Every time the ePHY layer within DTV 102 detects a WOL frame—i.e. it receives and detects a magic packet—DTV 102 has to wake up to check the WOL frame before ascertaining if the WOL was even intended for DTV 102. In addition, if the MAC address comparison indicates that the WOL was intended for another device, DTV 102 has to power down and enter standby/sleep mode again. This may result in DTV 102 to frequently wake up and power down for WOL detection, leading to additional power consumption, in addition to placing additional software requirements on DTV 102.

Figure 3:
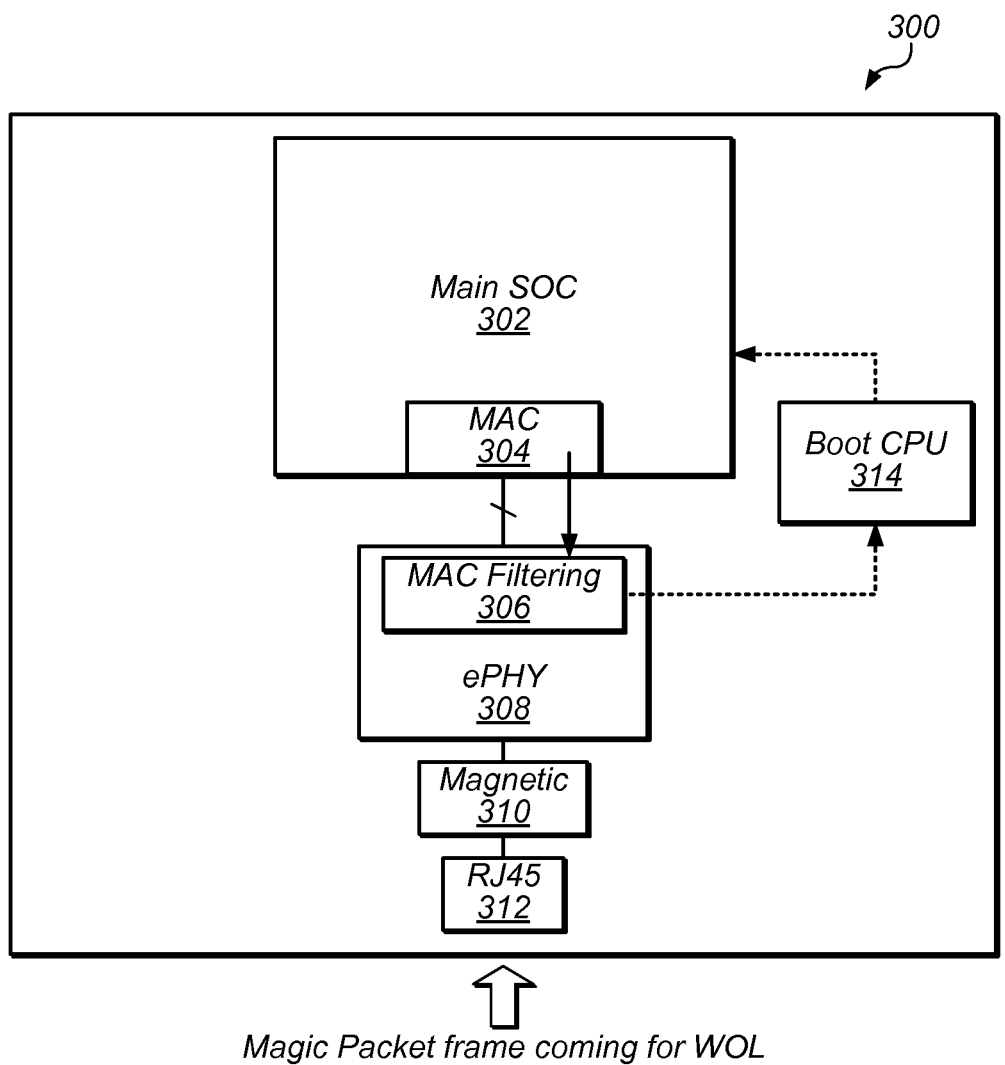
FIG. 3 shows a functional block diagram of one embodiment of a computer that can perform a WOL function without requiring waking up the main system upon receipt of a magic packet.

In order to alleviate some of the issues described above, a MAC filtering function may be included in ePHY layer 206 to perform the MAC address comparison between the MAC address in MAC layer 204 within SOC 202, and the MAC address contained in the incoming WOL packet frame. A partial block diagram of one embodiment of such a device is shown in FIG. 3. Device 200 shown in FIG. 3 may represent any of the devices coupling to network connection 102, as shown in FIG. 1. Device 300 may couple to network connection 102 via an RJ45 connector 312, interfacing with the ePHY layer 308 via magnetic coupling 310. The ePHY layer 308 interfaces with the MAC layer 304 within main SOC 302. As shown in FIG. 3, ePHY layer 308 may store the SOC's MAC address in an internal register within MAC filtering block (MFB) 306. During a system boot, SOC 302 may write its MAC address into the internal register within MFB 306 inside ePHY 308. Main SOC 302 and all peripheral LSI circuitry within device 300 may enter into standby mode (or sleep mode), with the exception of ePHY 308, which may remain operational to detect WOL packet frames, or magic packets. Upon detecting a magic packet, received from network connection 102 for example, MFB 306 inside ePHY 308 may perform the MAC address comparison, and may only generate the interrupt to boot CPU 314 if the MAC address in the magic packet matches the MAC address stored in MFB 306. Thus, main SOC 302 and the peripheral LSI circuitry in device 300 will be instructed to wake up only in case ePHY 308 has confirmed that the WOL transmitted through the detected magic packet is intended for device 300.

Operation of a device—exemplified by device 200 in FIG. 2—upon receiving a WOL packet frame (or magic packet) may be characterized by the sequence shown in flowchart 400 in FIG. 4. The ePHY block within the device (e.g. ePHY 206) may detect a magic packet, or WOL frame (402). Upon detecting the WOL frame, the ePHY block asserts an interrupt signal to the boot CPU (404). In response to receiving the interrupt request, the boot CPU (e.g. boot CPU 212) instructs main SOC (e.g. main SOC 202) to reboot itself, and consequently also reboot the firmware that may be stored within the main SOC (406). The main SOC (and firmware) then reboot (408), and the MAC block in the main SOC performs the MAC address comparison (410). If the comparison indicates that the MAC address of the main SOC matches the MAC address in the WOL frame ("Yes" branch of 412), a system wide reboot is performed, and the entire system enters operational mode (414). On the other hand, if the comparison indicates that the MAC address of the main SOC does not match the MAC address in the WOL frame ("No" branch of 412), the main SOC returns to standby (sleep) mode (416).

In contrast, operation of a device—exemplified by device 300 in FIG. 3—upon receiving a WOL packet frame (or magic packet) may be characterized by the sequence shown in flowchart 500 in FIG. 5. During initial system boot up, the main SOC (e.g. main SOC 302) writes its MAC address into a register inside the ePHY block (502). The ePHY block within the device (e.g. ePHY 308) may detect a magic packet, or WOL frame (504). Upon detecting the WOL frame, the MAC Filtering block (e.g. MFB 306) in the ePhy block performs the MAC address comparison (506). If the comparison indicates that the MAC address of the main SOC matches the MAC address in the WOL frame ("Yes" branch of 508), the ePHY block asserts an interrupt signal to the boot CPU (510). In response to receiving the interrupt request, the boot CPU (e.g. boot CPU 314) instructs main SOC to perform the system boot up sequence (512). The system boot up sequence is then performed (514), and the system is now in operational mode, as instructed by the WOL frame. On the other hand, if the comparison indicates that the MAC address of the main SOC does not match the MAC address in the WOL frame ("No" branch of 508), the main SOC and most system elements remain in standby (sleep) mode (516).

Table 600 in FIG. 6 summarizes the differences between the operating modes illustrated in FIGS. 4 and 5, as associated with device 200 and device 300, respectively. As seen in table 600, the sequence shown in FIG. 5 provides an efficient way of avoiding frequent reboots by the system/device. In addition, the operation illustrated in FIG. 5 requires fewer steps each time a WOL frame/packet is detected by the device. Furthermore, the entire system 100 shown in FIG. 1 may benefit from devices 104-112 performing WOL according to the operation illustrated by flowchart 500. For example, a user may initiate a print job to networked printer 108 from computer 104. Computer 104 may consequently generate a WOL packet frame to wake up printer 108 and execute the print job. Computer 104 may then transmit the WOL packet containing the MAC address of printer 108 onto Ethernet network connection 102. Devices 106-112 may all be in standby/sleep mode, when receiving the WOL packet frame. The ePHY within digital television (DTV) 110 may detect the WOL packet, and perform the MAC address comparison. Because the MAC addresses don't match, DTV 110 may remain in full sleep mode. The ePHY within Blu-Ray/DVD player 112 may also detect the WOL packet, and perform the MAC address comparison. Because the MAC addresses don't match, Blu-Ray/DVD player 112 may also remain in full sleep mode. Finally, the ePHY within printer 108 may also detect the WOL packet, and perform the MAC address comparison. Because in this case the MAC addresses match, the ePHY may initiate a boot up of printer 108, which may boot up and/or exit sleep/standby mode, and execute the print job. It should also be noted, as previously mentioned, that additional devices such as a set-top box, a digital video recorder, a video game console, or any other networkable devices may also be coupled to Ethernet based network 102. Furthermore, other computers may also be coupled to network connection 102, configured to enter standby mode similar to other devices, where one attached computer may attempt to wake up another attached computer through a WOL packet, according to the operating principles described herein.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

I claim:

1. A device comprising:
  a main network controller block having an associated device Media Access Control (MAC) address, and configured to enter a low-power mode when so instructed; and
  an Ethernet physical layer (ePHY) block wherein the ePHY block is separately powered from the main network controller block and the ePHY block comprises a first register, and wherein the main network controller block is configured to write the device MAC address into the first register when the device initially boots up;
  the ePHY block is configured to:
  detect a Wake-On-LAN (WOL) packet comprising a target MAC address, while the main network controller block is in low-power mode;
  compare the target MAC address with the device MAC address; and
  generate an interrupt signal to initiate a boot up of the main network controller block if the main network controller block is in the low-power mode and the comparison indicates that the target MAC address matches the device MAC address.

2. The device of claim 1, further comprising a boot processing unit, wherein the ePHY block is further configured to transmit the interrupt signal to a boot processing unit.

3. The device of claim 2, wherein the ePHY block is configured to transmit the interrupt signal to the boot processing unit via a dedicated interrupt pin of the boot processing unit.

4. The device of claim 2, wherein the boot processing unit is configured to initiate the boot up of the main network controller block in response to receiving the interrupt signal.

5. The device of claim 4, wherein the main network controller block is configured to remain in the low-power mode if the main network controller block is in the low-power mode, unless the boot processing unit initiates the boot up of the main network controller block.

6. The device of claim 1, wherein the main network controller block is configured to write the device MAC address into the first register prior to the main network controller block entering the low-power mode.

7. A method for performing a Wake-On-LAN (WOL) of a device comprising a main network controller block residing in a low-power mode, and having an associated device Media Access Control (MAC) address, the method comprising:
  an Ethernet physical layer (ePHY) block in the device detecting a WOL packet comprising a target MAC address, wherein the ePHY block is separately powered from the main network controller block;
  the ePHY block comprises a first register, and wherein the main network controller block is configured to write the device MAC address into the first register when the device initially boots up;
  the ePHY block comparing the target MAC address with the device MAC address; and
  the ePHY block initiating a boot up of the main network controller block in response to said comparing indicating that that the target MAC address matches the device MAC address.

8. The method of claim 7, wherein said initiating comprises the ePHY block generating an interrupt signal and transmitting the interrupt signal to a boot up processor.

9. The method of claim 8, further comprising the boot up processor instructing the main network controller block to exit the low-power mode.

10. The method of claim 7, further comprising the main network controller block writing the device MAC address into the ePHY block prior to the main network controller block entering the low-power mode.

11. A method for performing a Wake-On-LAN (WOL) of a device comprising a main network controller block residing in a low-power mode, and having an associated device Media Access Control (MAC) address, the method comprising:
 an Ethernet physical layer (ePHY) block in the device detecting a WOL packet comprising a target MAC address, wherein the ePHY block is separately powered from the main network controller block;
 the ePHY block comprises a first register, and wherein the main network controller block is configured to write the device MAC address into the first register when the device initially boots up;
 the ePHY block comparing the target MAC address with the device MAC address; and
 the main network controller block remaining in the low-power mode in response to said comparing indicating that that the target MAC address does not match the device MAC address.

12. A system comprising:
 a first device;
 one or more additional devices, each of the one or more additional devices having a unique Media Access Control (MAC) address;
 a local area network (LAN) connection configured to couple the one or more additional devices and the first device together in a LAN;
 wherein the first device is configured to transmit a Wake-On-LAN (WOL) packet comprising a target MAC address over the LAN connection;
 wherein a second device of the one or more other additional devices is configured to receive the WOL packet; and
 wherein the second device comprises a main network controller block and a first Ethernet physical layer (ePHY) block wherein the ePHY block is separately powered from the main network controller block and the ePHY block is configured to store the unique MAC address of the second device in a first register when the second device initially boots up;
 the ePHY block is configured to:
  detect the WOL packet;
  compare the target MAC address with the unique MAC address of the second device; and
  initiate a boot up of the second device when:
   the second device, including the main network controller block, resides in low-power mode when the WOL packet is detected by the first ePHY block; and the comparison indicates that the target MAC address matches the unique MAC address of the second device.

13. The system of claim 12, wherein, the second device is configured to remain in the low-power mode when: the second device resides in the low-power mode when the WOL packet is detected by the first ePHY block; and the comparison indicates that the target MAC address does not match the unique MAC address of the second device.

14. The system of claim 12, wherein the first ePHY block is configured to store the unique MAC address of the second device in the first register prior to the main network controller block entering the low-power mode.

15. The system of claim 14, wherein the first register is programmable by another component of the second device to store the unique MAC address of the second device.

16. The system of claim 12, wherein each device of the one or more additional devices is configured to receive the WOL packet; and wherein each given device of the one or more additional devices comprises a respective ePHY block configured to: detect the WOL packet; compare the target MAC address with the unique MAC address of the given device; and initiate a boot up of the given device when: the given device resides in low-power mode when the WOL packet is detected by the respective ePHY block of the given device; and the comparison indicates that the target MAC address matches the unique MAC address of the given device.

17. The system of claim 16, wherein, each given device of the one or more additional devices is configured to remain in the low-power mode when: the given device resides in the low-power mode when the WOL packet is detected by the respective ePHY block of the given device; and the comparison indicates that the target MAC address does not match the unique MAC address of the given device.

18. The system of claim 12, wherein the one or more additional devices comprise one or more of: a printer; a computer; a digital display/television; a Blu-Ray player; a DVD player; a set-top box; a digital recording device; or a video game console.

19. The system of claim 12, wherein the first device is a computer.

* * * * *